United States Patent [19]
Kishimoto

[11] Patent Number: 5,564,310
[45] Date of Patent: Oct. 15, 1996

[54] SHIFTING APPARATUS FOR A BICYCLE HAVING LOCKING MEMBERS ENCLOSED RADIALLY WITHIN A TAKEUP ELEMENT

[75] Inventor: Hitoshi Kishimoto, Osaka, Japan

[73] Assignee: Shimano, Inc., Osaka, Japan

[21] Appl. No.: 364,607

[22] Filed: Dec. 27, 1994

[30] Foreign Application Priority Data

Dec. 28, 1993 [JP] Japan .................. 5-070375

[51] Int. Cl.$^6$ .................................. B62M 25/04
[52] U.S. Cl. .................. 74/489; 74/475; 74/502.2
[58] Field of Search ............... 74/489, 475, 502.2, 74/142

[56] References Cited

U.S. PATENT DOCUMENTS

| | | | |
|---|---|---|---|
| 4,768,395 | 9/1988 | Tagawa | 74/489 |
| 4,905,537 | 3/1990 | Nagano | 74/531 |
| 5,009,629 | 4/1991 | Tagawa | 474/80 |
| 5,012,692 | 5/1991 | Nagano | 74/489 |
| 5,044,213 | 9/1991 | Nagano | 74/142 |
| 5,052,241 | 10/1991 | Nagano | 74/489 |
| 5,052,242 | 10/1991 | Look | 74/502.2 |
| 5,095,768 | 3/1992 | Nagano | 74/502.2 |
| 5,186,071 | 2/1993 | Iwasaki | 74/489 |
| 5,203,213 | 4/1993 | Nagano | 74/475 |

FOREIGN PATENT DOCUMENTS

| | | | |
|---|---|---|---|
| 0354081 | 2/1990 | European Pat. Off. | B62M 25/04 |
| 0361335 | 4/1990 | European Pat. Off. | B62M 25/04 |
| 2540818 | 8/1984 | France | B62M 25/04 |
| 2603861 | 3/1988 | France | B62K 23/06 |
| 4-183696 | 6/1992 | Japan . | |

*Primary Examiner*—Charles A. Marmor
*Assistant Examiner*—David Fenstermacher
*Attorney, Agent, or Firm*—James A. Deland

[57] ABSTRACT

A shifting apparatus for use on a bicycle for shifting a change speed device through a control cable. The shifting apparatus includes a support shaft attachable to a bicycle body, a takeup element rotatably supported by the support shaft for winding and unwinding the control cable, shift levers for rotating the takeup element, and a lock mechanism for maintaining the takeup element in a selected position. The takeup element includes a takeup portion supported adjacent one end of the support shaft, and a wall extending from the takeup portion toward the other end of the support shaft. The wall defines, in combination with the takeup portion, an accommodating space opening toward the other end for accommodating the lock mechanism. One of the shift levers has a proximal portion disposed between the wall and the other end of the support shaft and covering the accommodating space from the other end of the support shaft.

19 Claims, 6 Drawing Sheets

SHIFTING APPARATUS FOR A BICYCLE HAVING LOCKING MEMBERS ENCLOSED RADIALLY WITHIN A TAKEUP ELEMENT

BACKGROUND OF THE INVENTION

1. Field of the Invention

The present invention relates to a shifting apparatus for use on a bicycle for shifting a change speed device through a control cable, which shifting apparatus includes a support shaft attachable to a bicycle body, a takeup element rotatably mounted on the support shaft for winding and unwinding the control cable, shift levers for rotating the takeup element, and a lock mechanism for maintaining the takeup element in a selected position.

2. Description of the Related Art

A conventional shifting apparatus for a bicycle as noted above is disclosed in U.S. Pat. No. 5,009,629, for example.

This known apparatus has a support shaft attached at a longitudinally intermediate position thereof to a bicycle body. The support shaft supports shift levers and a lever interlock member mounted on the support shaft from a lower end thereof. The lever interlock member is interlocked to the shift levers through a ratchet type interlocking mechanism to rotate a takeup element. The takeup element and a lock mechanism for setting a position of the takeup element are mounted on the support shaft from an upper end thereof.

In the above construction, the takeup element defines a recess for receiving part of the lock mechanism, but this recess does not accommodate the entire lock mechanism. After locking action, the lock mechanism lies adjacent the upper end of the support shaft which is not covered by the shift levers or other components. Thus, although the entire shifting apparatus is covered by a ease, sand and water tend to enter the ease through an opening inevitably formed in the ease in a range of pivotal movement of the shift levers. Sand or water entering the case and reaching the lock mechanism tends to impair operability of the lock mechanism having balls and a ball bearing.

Further, in the above known construction, the various components are assembled from the opposite ends toward a middle position of the support shaft, not from one end to the other end of the support shaft. This lowers the efficiency of assembly and repair operations.

SUMMARY OF THE INVENTION

The object of the present invention is to provide a shifting apparatus having such a construction that a lock mechanism and the like have little possibility of malfunctioning even when sand and water should enter a case.

The above object is fulfilled, according to the present invention, by a shifting apparatus for a bicycle as described in the outset hereof, characterized in that the takeup element includes a takeup portion supported adjacent one end of the support shaft for winding the control cable, and a wall extending from the takeup portion toward the other end of the support shaft, the wall defining ratchets peripherally thereof and, in combination with the takeup portion, an accommodating space opening toward the other end, the lock mechanism being mounted in the accommodating space, and the shift levers include proximal portions pivotably mounted on the support shaft between the wall and the other end of the support shaft, the proximal portions covering the accommodating space from the other end.

In the above construction, the proximal portions of the shift levers cover the accommodating space, such that the lock mechanism is substantially surrounded by the takeup element and shift levers. Consequently, sand and water entering the case have little possibility of reaching the lock mechanism. Even if sand and water enter the case, the takeup element is unlikely to have difficulties of rotation or position setting, thereby enabling desired shifting operations.

According to a further feature of the present invention, the support shaft has an outside diameter diminishing stepwise from one end to the other end thereof. This shape of the support shaft allows the pivotable and rotatable components to be mounted thereon from the other end, to realize efficient assembly and repair operations.

Further and other objects, features and effects of the invention will become more apparent from the following more detailed description of embodiments of the invention taken with reference to the accompanying drawings.

DETAILED DESCRIPTION OF THE PREFERRED EMBODIMENTS

Figure 1:
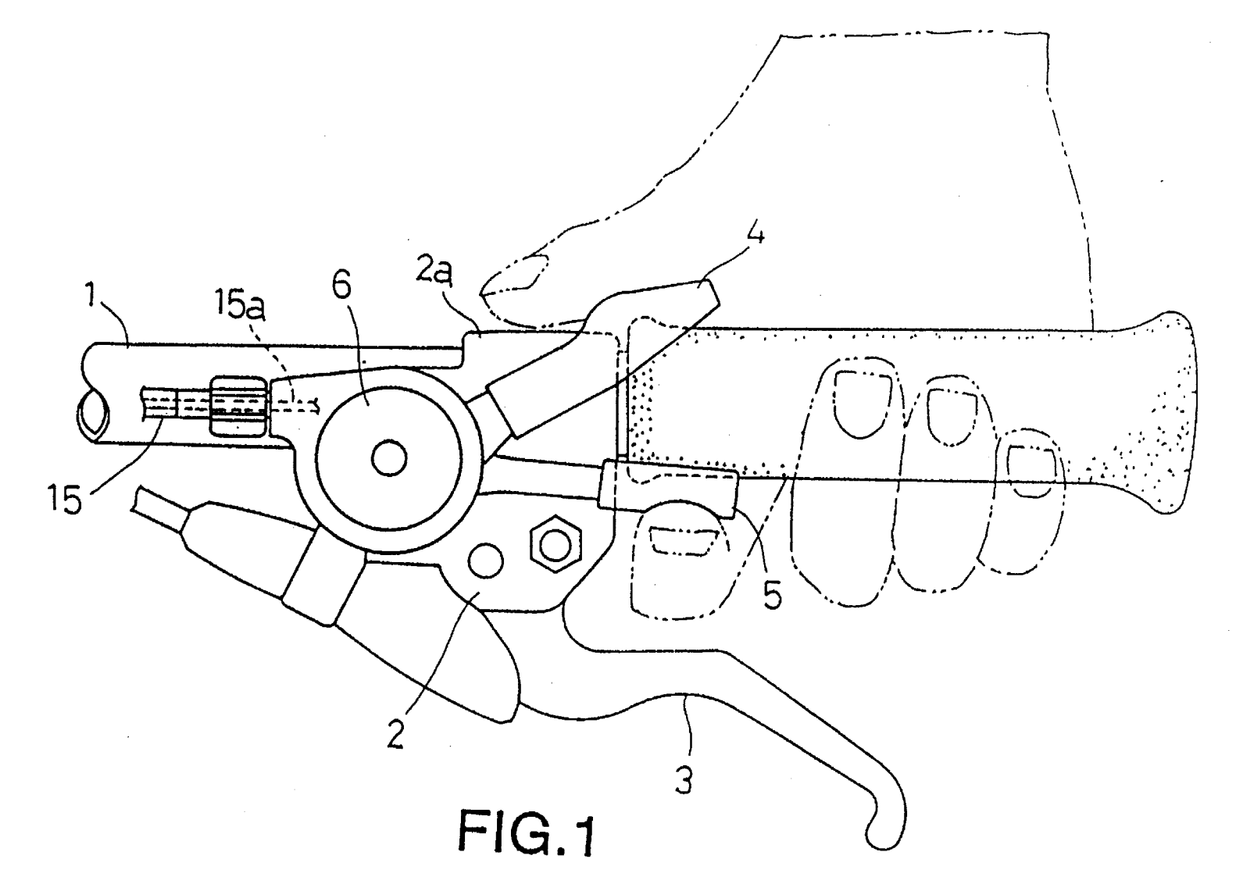
FIG. 1 is a bottom view of a brake lever assembly for a bicycle including a shifting apparatus according to the present invention.

FIG. 1 shows a brake lever assembly having a shifting apparatus for a bicycle. A bicycle handlebar 1 supports a lever bracket 2 fastened thereto by a band 2a. The lever bracket 2 pivotably supports a brake lever 3. The lever bracket 2 also supports the shifting apparatus including two shift levers 4 and 5 and a shifter case 6.

Figure 2:
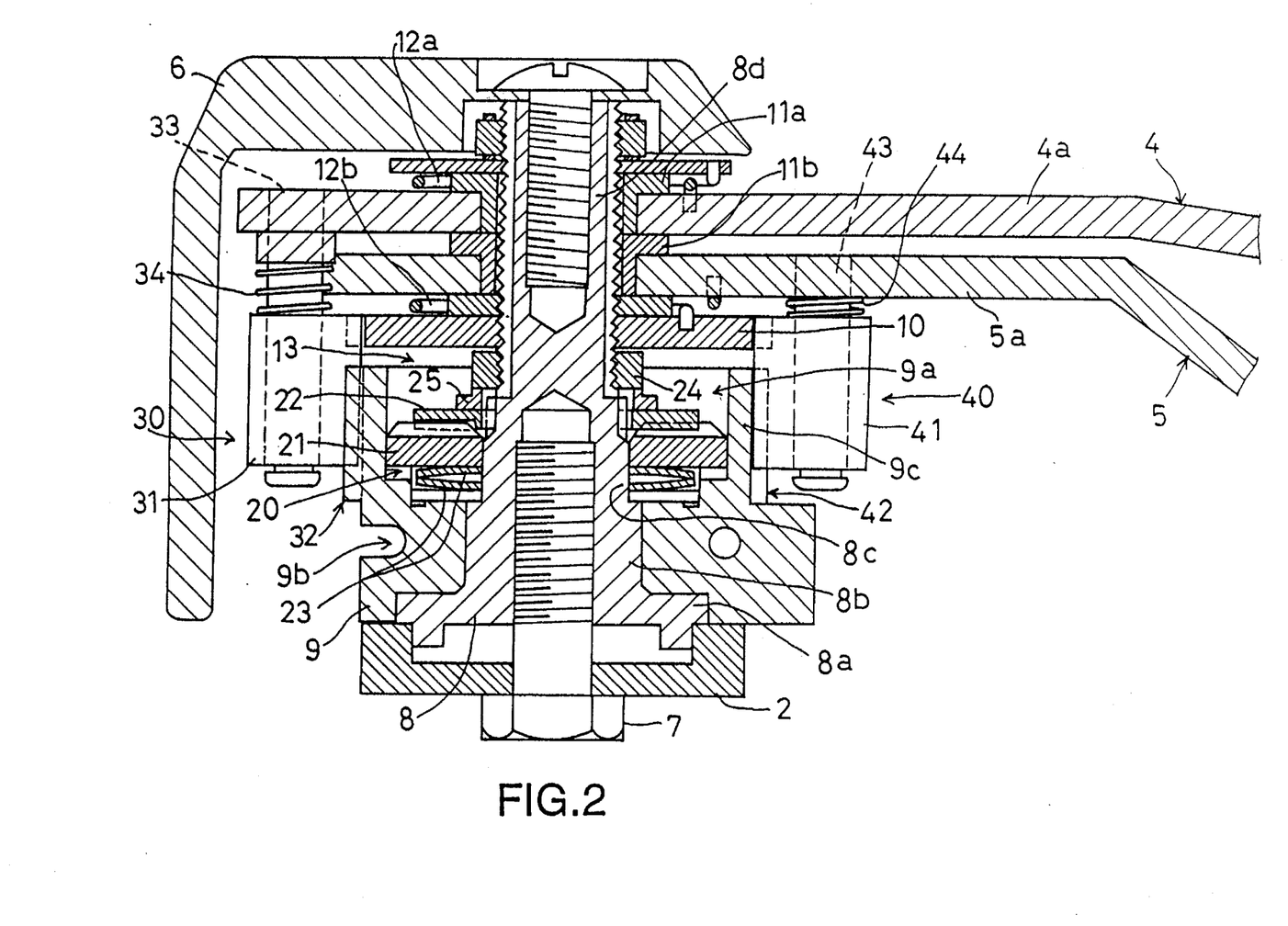
FIG. 2 is a sectional view of the shifting apparatus.

As shown in FIG. 2, the shifting apparatus includes a support shaft 8 fixed to the lever bracket 2 by a mounting bolt 7, a takeup element 9 mounted on a proximal portion of the support shaft 8, a lock mechanism 20 having a pair of lock plates 21 and 22 mounted in an accommodating space 9a defined in the takeup element 9, the two shift levers 4 and 5 and shifter case 6 mounted on a distal portion of the support shaft 8, a cam element 10 mounted on the support shaft 8 between the shift lever 4, 5 and takeup element 9, a first ratchet mechanism 30 having a first feed pawl 31 attached to a proximal portion 4a of one of the shift levers 4 and 5, i.e. the first shift lever 4, and a second ratchet mechanism 40 having a second feed pawl 41 attached to a proximal portion 5a of the other shift lever 5, i.e. the second shift lever 5. Details of these components will be described below.

The takeup element 9 is rotatably mounted on the support shaft 8, and includes a drum portion for winding, along a wire groove 9b, an inner wire 15b of a control cable 15 extending from a front or rear change speed device (not shown). The takeup element 9 is rotatable forward or backward relative to the support shaft 8 to wind or unwind the inner wire 15*a*.

Figure 3:
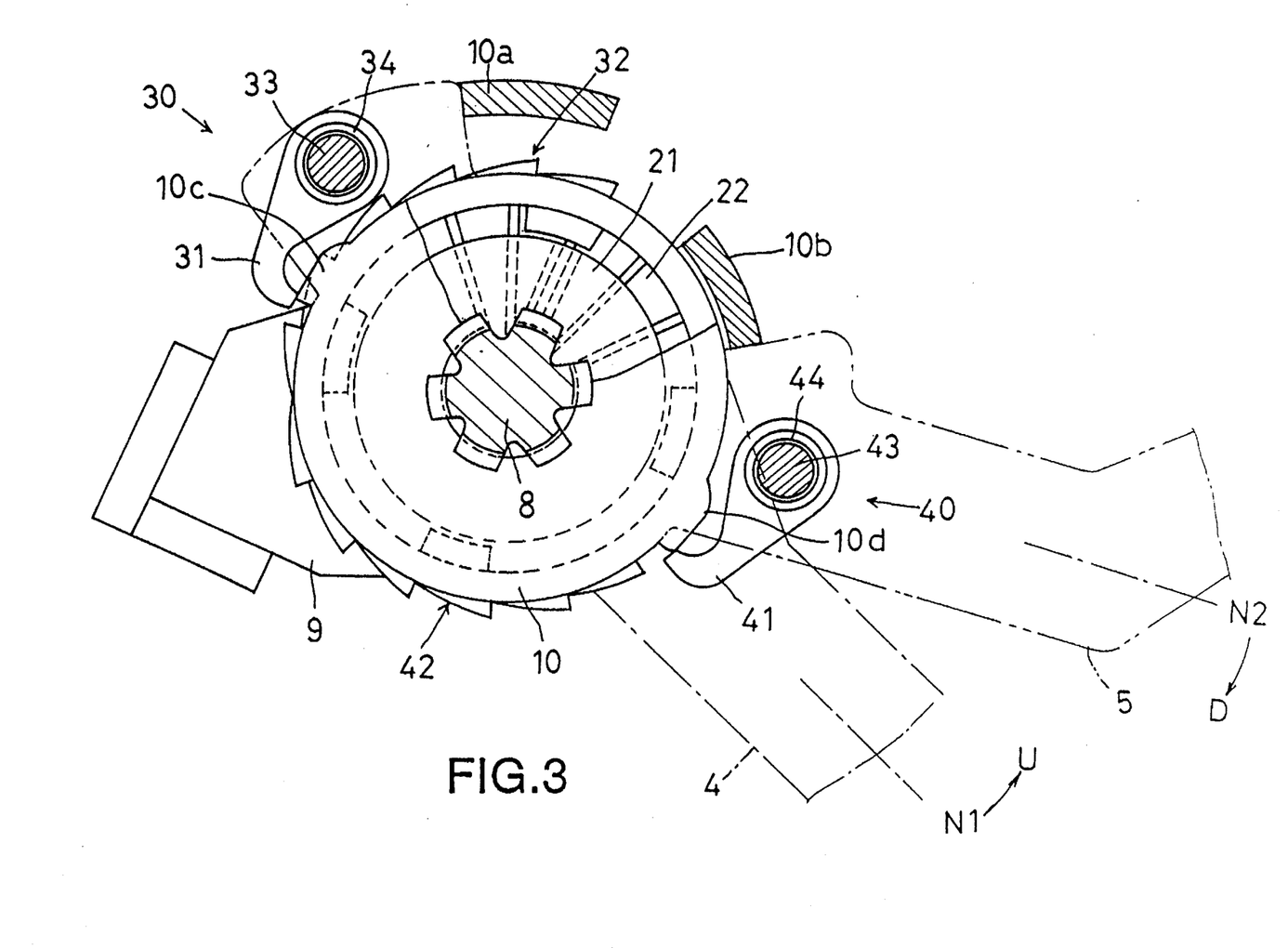
FIG. 3 is a plan view of ratchet mechanisms of the shifting apparatus.

Each of the shift levers 4 and 5 has the proximal portion 4*a* or 5*a* mounted on the support shaft 8 through a bush 11*a* or 11*b* to be pivotable about an axis of the support shaft 8. As shown in FIGS. 2 and 3, the first shift lever 4 is biased by a return spring 12*a* to an original position N1, i.e. to a position in which a part of the proximal portion 4*a* supporting the first feed pawl 31 contacts a first stopper 10*a* formed on the cam element 10. Similarly, the second shift lever 5 is biased by a return spring 12*b* to an original position N2, i.e. to a position in which a part of the proximal portion 5*a* supporting the second feed pawl 41 contacts a second stopper 10*b* formed on the cam element 10.

As shown in FIGS. 2 and 3, a pair of ratchets 32 and 42 are formed on outer peripheral walls of the takeup element 9 defining the accommodating space 9*a*, and opposed to each other across an axis of rotation of the takeup element 9. The first ratchet mechanism 30 includes one of these ratchets 32 and the first feed pawl 31 which is pivotably attached to a first pawl axis 33 extending from the proximal portion 4*a* of the first shift lever 4 toward the first ratchet 32. When the first shift lever 4 is in the original position N1, a forward end of the first feed pawl 31 rides on a first cam portion 10*c* of the cam element 10. Thus, the first feed pawl 31 is disengaged from the first ratchet 32 by pushing action of the first cam portion 10*c*, to allow the second shift lever 5 to rotate the takeup element 9. When the first shift lever 4 pivots in a shifting direction U from the original position N1 in FIG. 3, the first feed pawl 31 disengages from the first cam portion 10*c* and, under a biasing force of a first pawl spring 34, pivots toward the first ratchet 32 to engage one of ratchet teeth of the first ratchet 32. Consequently, the takeup element 9 is rotatable with the pivotal movement of the first shift lever 4. When, subsequently, the first shift lever 4 pivots from a selected shift position to the original position N1, the first feed pawl 31 is automatically disengaged from the first ratchet 32 by a tooth shape of the first ratchet 32. Thus, when the first shift lever 4 pivots in the direction U from the original position N1 to a selected shift position, the first ratchet mechanism 30 transmits a rotating force of the first shift lever 4 to the takeup element 9 through the engagement between the first feed pawl 31 and first ratchet 32 to rotate the takeup element 9. When the first shift lever 4 pivots from a selected shift position to the original position N1, the first feed pawl 31 is disengaged from the first ratchet 32 to allow a relative rotation between the first shift lever 4 and takeup element 9. As a result, the first shift lever 4 returns to the original position N1, leaving the takeup element 9 in the selected shift position.

The second ratchet mechanism 40 includes the other of the two ratchets, i.e. the second ratchet 42, and the second feed pawl 41 which is pivotably attached to a second pawl axis 43 extending from the proximal portion 5*a* of the second shift lever 5 toward the second ratchet 42. When the second shift lever 5 is in the original position N2, a forward end of the second feed pawl 41 rides on a second cam portion 10*d* of the cam element 10. Thus, the second feed pawl 41 is disengaged from the second ratchet 42 by pushing action of the second cam portion 10*d*, to allow the first shift lever 4 to rotate the takeup element 9. When the second shift lever 5 pivots in a shifting direction D from the original position N2 in FIG. 3, the second feed pawl 41 disengages from the second cam portion 10*d* and, under a biasing force of a second pawl spring 44, pivots toward the second ratchet 42 to engage one of ratchet teeth of the second ratchet 42. Consequently, the takeup element 9 is rotatable with the pivotal movement of the second shift lever 5. When the second shift lever 5 pivots from a selected shift position to the original position N2, the second feed pawl 41 is automatically disengaged from the second ratchet 42 by a tooth shape of the second ratchet 42. Thus, when the second shift lever 5 pivots in the direction D from the original position N2 to a selected shift position, the second ratchet mechanism 40 transmits a rotating force of the second shift lever 5 to the takeup element 9 through the engagement between the second feed pawl 41 and second ratchet 42 to rotate the takeup element 9. When the second shift lever 5 pivots from a selected shift position to the original position N2, the second feed pawl 41 is disengaged from the second ratchet 42 to allow a relative rotation between the second shift lever 5 and takeup element 9. As a result, the second shift lever 5 returns to the original position N2, leaving the takeup element 9 in the selected shift position.

Figure 4:
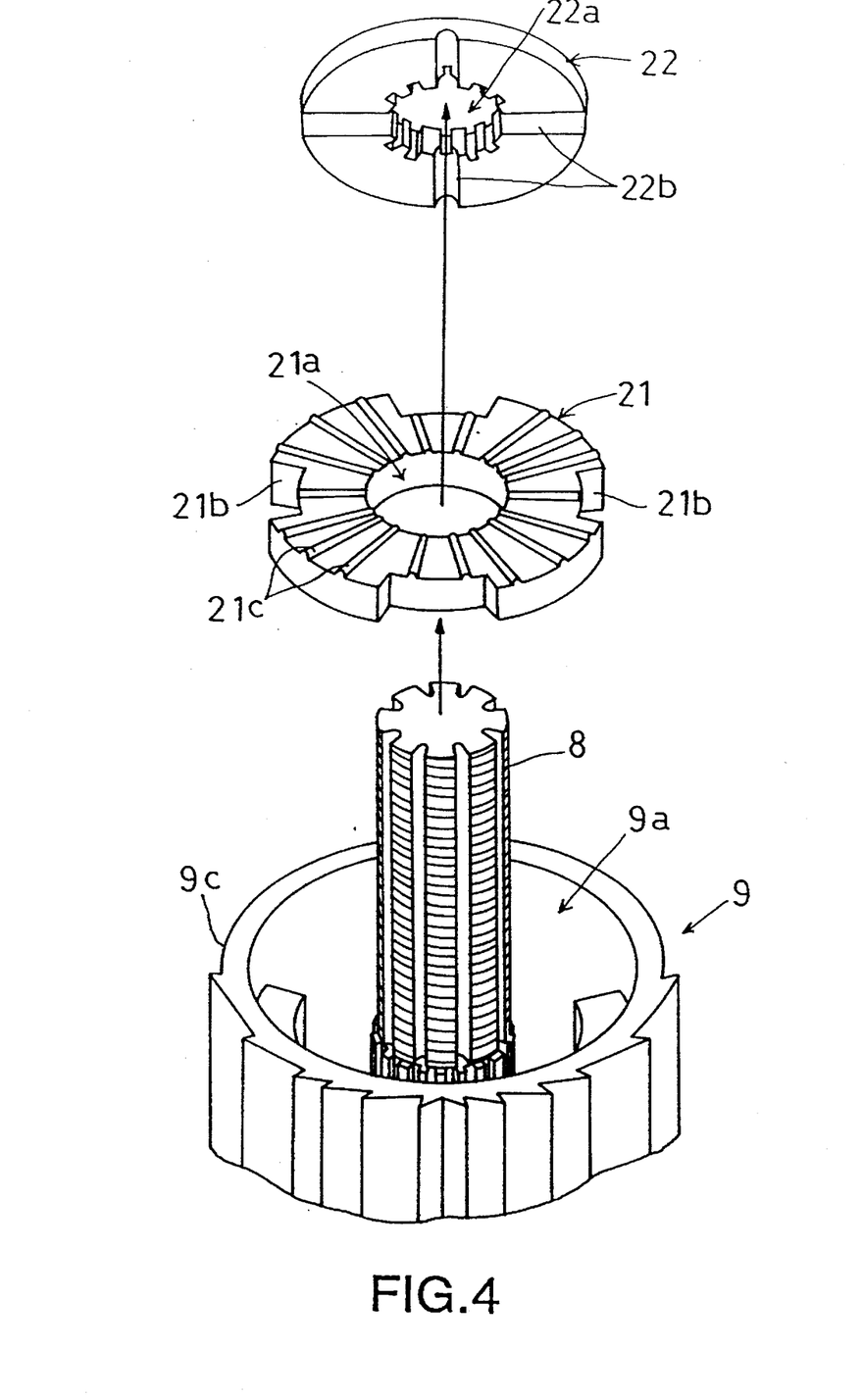
FIG. 4 is an exploded perspective view of a lock mechanism of the shifting apparatus.

The lock mechanism 20 includes a pair of lock plates 21 and 22 arranged in the accommodating space 9*a* and mounted on the support shaft 8, and a pair of disc springs 23 arranged between the lock plate 21 and the drum portion of the takeup element 9 and mounted on the support shaft 8. As shown in FIG. 4, one of the lock plates 21 has a circular mounting opening 21*a* formed centrally and splines 21*b* formed peripherally thereof. The lock plate 21 is mounted on the support shaft 8 to be rotatable circumferentially as well as slidable axially thereof. Further, the lock plate 21 is fitted in a cylindrical portion 9*c* of the takeup element 9 defining the accommodating space 9*a*, with the splines 21*b* engaging the cylindrical portion 9*c* only to be rotatable therewith. Thus, the lock plate 21 is axially slidable relative to both the support shaft 8 and takeup element 9, and rotatable with the takeup element 9. The other lock plate 22 has a splined opening 22*a*, as shown in FIG. 4, for fitting on and in spline engagement with the support shaft 8. As shown in FIG. 2, the lock plate 22 is held in place by a clamp nut 24 through a spacer 25 not to be rotatable or slidable relative to the support shaft 8. The disc springs 23 bias the lock plate 21 to slide toward the lock plate 22, thereby to maintain the lock plate 21 in a position in which a plurality of ridges 21*c*, as shown in FIG. 4, of the lock plate 21 engage a plurality of grooves 22*b*, as shown in FIG. 4, of the lock plate 22. With the lock plate 21 maintained in the above engaged position, the lock plate 22 applies a rotation stopping action to the takeup element 9 through the lock plate 21. When the takeup element 9 is rotated by an operating force greater than a predetermined force provided by a force of the disc springs 23, the lock plate 21 slides away from the lock plate 22 against the disc springs 23. As a result, the ridges 21*c* disengage from the grooves 22*b* of the lock plate 22 to allow rotation of the takeup element 9. Thus, the lock mechanism 20 allows the takeup element 9 to be rotated by an operating force greater than the predetermined force, sets the takeup element 9 to a selected shift position when the lock plate 21 is switched from the non-engaged position to the engaged position, and maintains the takeup element 9 in the selected shift position against a restoring force of the change speed device applied through the inner wire 15*a*.

Thus, when the first shift lever 4 is operated by a force exceeding the predetermined force to pivot in the shifting direction U from the original position N1, the operating force acts through the first ratchet mechanism 30 first as a force to release the lock mechanism 20, and then as a force to rotate the takeup element 9, whereby the takeup element 9 rotates to wind the inner wire 15*a* thereon. When the first shift lever 4 is released after the above shifting operation, the takeup element 9 has already rotated to a new selected position and completed winding of a certain length of the inner wire 15a. The lock plate 21 is switched from the non-engaged position to the engaged position by the biasing force of the disc springs 23. The lock mechanism 20 maintains the takeup element 9 in the new selected position. The takeup element 9 in this position maintains the inner wire 15a in a predetermined wound state. The first shift lever 4 automatically returns to the original position N1 under the force of return spring 12a.

When the second shift lever 5 is operated in the shifting direction D from the original position N2, the operating force acts through the second ratchet mechanism 40 first as a force to release the lock mechanism 20, and then as a force to rotate the takeup element 9, whereby the takeup element 9 rotates to unwind the inner wire 15a therefrom. When the second shift lever 5 is released after the above shifting operation, the takeup element 9 has already rotated to a new selected position and completed unwinding of a certain length of the inner wire 15a. The lock plate 21 is switched from the non-engaged position to the engaged position by the biasing force of the disc springs 23. The lock mechanism 20 maintains the takeup element 9 in the new selected position. The takeup element 9 in this position maintains the inner wire 15a in a predetermined unwound state. The second shift lever 5 automatically returns to the original position N2 under the force of return spring 12b.

Figure 5:
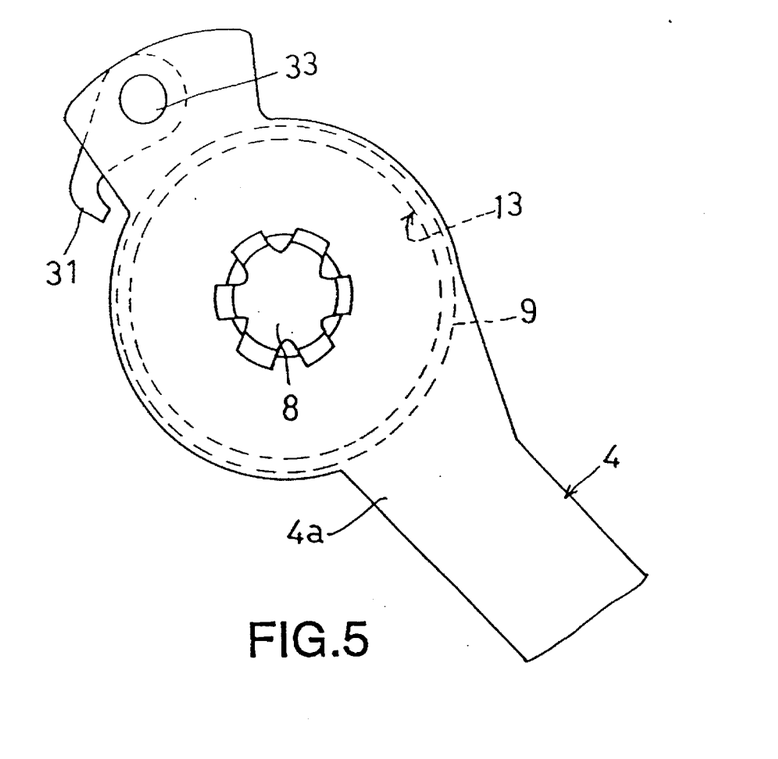
FIG. 5 is a fragmentary plan view of a first shift lever.
Figure 6:
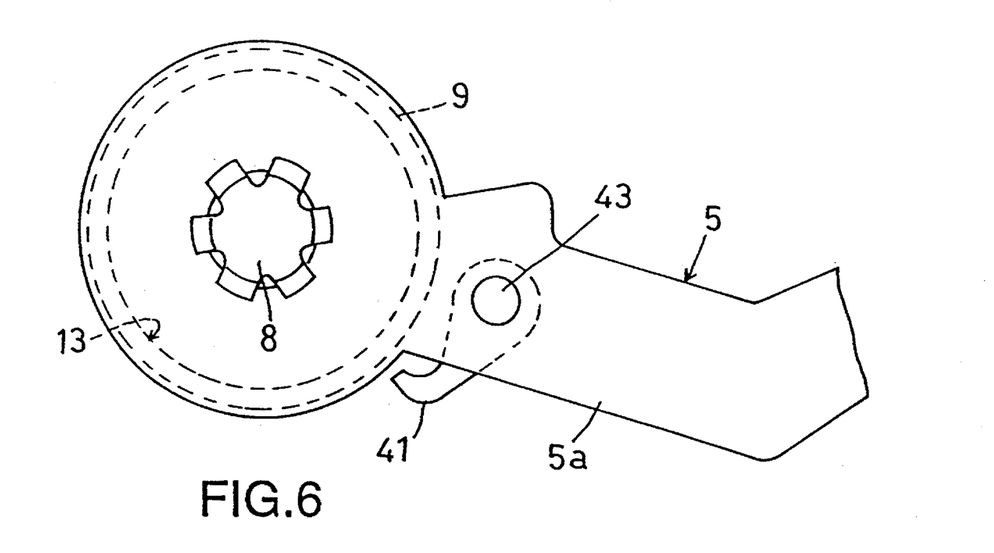
FIG. 6 is a fragmentary plan view of a second shift lever.

The cam element 10 is disposed adjacent an assembling opening 13 of the accommodating space 9a opposed to the proximal portions 4a and 5a of the shift levers 4 and 5. The proximal portion 4a of the first shift lever 4 and the proximal portion 5a of the second shift lever 5 are shaped as shown in FIGS. 5 and 6, which are larger than the assembling opening 13, and these proximal portions 4a and 5a are arranged adjacent the assembling opening 13. With the lock mechanism 20 mounted in the accommodating space 9a, and the proximal portions 4a and 5a of the shift levers 4 and 5 arranged adjacent the assembling opening 13, the lock mechanism 20 is covered by the takeup element 9 and the proximal portions 4a and 5a of the shift levers 4 and 5. Consequently, sand and water entering the shifter case 6 have little possibility of reaching the lock mechanism 20. The proximal portions 4a and 5a of the shift levers 4 and 5 larger than the assembling opening 13 effectively cover the assembling opening 13. However, even if the proximal portions 4a and 5a of the shift levers 4 and 5 are formed smaller than the assembling opening 13, the proximal portions 4a and 5a arranged adjacent the assembling opening 13 will produce a similar covering effect. Thus, the proximal portions 4a and 5a of the shift levers 4 and 5 may be formed to have such a size.

In the above embodiment, the ratchets 32 and 42 are formed on the outer peripheral walls of the takeup element 9 defining the accommodating space 9a, and the first pawl axis 33 supporting the first feed pawl 31 and the second pawl axis 43 supporting the second feed pawl 41 extend from the proximal portions 4a and 5a toward the cylindrical portion 9c of the takeup element 9 defining the ratchets 32 and 42, respectively. Thus, the ratchet mechanisms 30 and 40 are arranged substantially in the same level axially of the support shaft 8 as the lock mechanism 20. This arrangement allows the entire shifting apparatus to have a relatively small size axially of the support shaft 8, thereby contributing toward compactness of the apparatus.

Further, the first ratchet 32 and second ratchet 42 are opposed to each other diametrically of the takeup element 9 across the axis of rotation thereof. The two ratchets 32 and 42 may be formed on the takeup element 9 even if the takeup element 9 has a small axial length, compared with a case of arranging the two ratchets along the same peripheral side axially of the takeup element 9. This feature also allows the entire shifting apparatus to have a relatively small size axially of the support shaft 8.

As shown in FIG. 2, the support shaft 8 includes a first shaft portion 8a for supporting a lower region of the takeup element 9, and a second shaft portion 8b for supporting an upper region of the support shaft 8, the second shaft portion 8b having a smaller outside diameter than the first shaft portion 8a. The support shaft 8 further includes a third shaft portion 8c having a still smaller diameter than the second shaft portion 8b, for supporting the lock plate 21 of the lock mechanism 20. The support shaft 8 also includes a fourth shaft portion 8d having a still smaller diameter than the third shaft portion 8c, for supporting the shift levers 4 and 5. In this way, the support shaft 8 has a diameter varying stepwise axially thereof. The takeup element 9, lock mechanism 20, cam element 10 and shift levers 4 and 5 are assembled in the stated order on the support shaft 8. These components are positioned in contact with shoulders provided by the above differences in diameter of the support shaft 8. These positions are the assembled positions of the respective components. This feature realizes an efficient assembling operation requiring no special adjustment to be made to the assembled positions.

Assembly and repair operations can be carried out with improved efficiency also in that the components are assembled from one end to the other end of the support shaft, not from the opposite ends to an intermediate position thereof. In this embodiment, taking account of operability of the shift levers by the thumb and finger of a hand gripping the handlebar, the inner wire 15a is wound on the takeup element 9 by an operation of the first shift lever 4 in the direction U toward the second shift lever 5 in the original position N2. Conversely, the inner wire 15a is unwound from the takeup element 9 by an operation of the second shift lever 5 in the direction D toward the first shift lever 4 in the original position N1.

Figure 7:
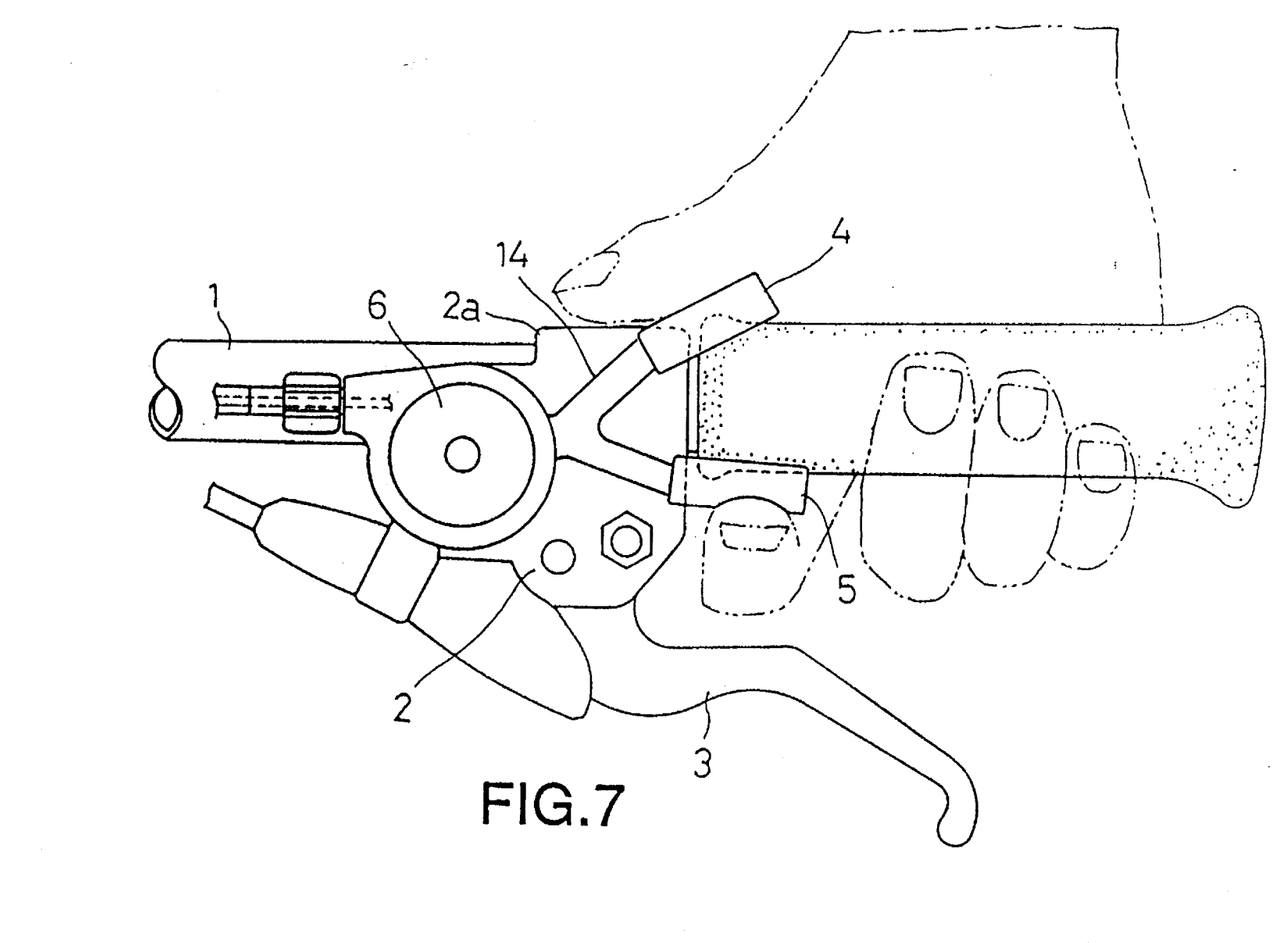
FIG. 7 is a bottom view of a shifting apparatus in a different embodiment of the invention.

FIG. 7 shows a shifting apparatus in a different embodiment of the invention.

This apparatus has a single bifurcate shift lever 14 forked into two distal control ends, which automatically returns to an original position. One of the control ends acts as the shift lever 4 for rotating the takeup element 9 in the winding direction, while the other control end acts as the shift lever 5 for rotating the takeup element 9 in the unwinding direction, That is, the first shift lever 4 and second shift lever 5 are integrated into the single shift lever 14.

The inner wire may be wound and unwound by operating a single shift lever having two control ends as above. Alternatively, a single shift lever with a single distal control end may be used to wind and unwind the inner wire.

In the foregoing embodiment, the takeup element 9 is maintained in a selected position by the engagement between the ridges and grooves. This engaging device may be replaced by a device utilizing friction between a fixed lock element and a lock element interlocked to the takeup element. These devices are collectively called herein the lock mechanism 20.

As distinct from the described embodiment, the present invention is applicable to a construction where the shift levers are attached to the proximal portion of the support shaft and the takeup element to the distal portion thereof. Thus, the proximal portion is called one end of the support shaft, and the distal portion the other end thereof.

What is claimed is:

1. A shifting apparatus for a bicycle for shifting a change speed device through a control cable, comprising:

a support shaft attachable to a bicycle body, said support shaft having an axis and a first and a second ends;

a takeup element rotatably mounted on said support shaft for winding said control cable, and biased by said control cable in an unwinding direction, said takeup element including:

a takeup portion supported adjacent said first end of said support shaft for winding said control cable; and a cylindrical portion including a wall extending from said takeup portion toward said second end of said support shaft, said wall defining ratchets peripherally thereof and, in combination with said takeup portion, an accommodating space radially inside said wall, said accommodating space opening toward said second end;

shift lever means for rotating said takeup element in a winding direction and said unwinding direction, said shift lever means including:

a proximal portion pivotably mounted on said support shaft, said proximal portion covering said accommodating space from said second end; and a feed pawl extending from said proximal portion toward said first end for engaging said ratchets; and lock means for maintaining said takeup element in a position to which said takeup element is rotated by said shift lever means, said lock means being mounted in said accommodating space formed radially inside said wall.

2. A shifting apparatus as defined in claim 1, wherein said proximal portion of said shift lever means has a larger outside diameter than said accommodating space.

3. A shifting apparatus as defined in claim 1, wherein said lock means includes:

a first lock plate mounted on said support shaft and locked against rotation and axial movement relative thereto, said first lock plate having an engageable surface extending substantially perpendicular to said axis of said support shaft; and a second lock plate rotatable with said takeup element, said second lock plate having an engaging surface opposed to said engageable surface, said second lock plate being axially movable relative to said support shaft between an engaged position in which said engaging surface engages said engageable surface, and a non-engaged position in which said engaging surface is disengaged from said engageable surface.

4. A shifting apparatus as defined in claim 3, wherein said engageable surface includes radially extending engageable grooves, and said engaging surface includes engaging ridges for engaging said engageable grooves.

5. A shifting apparatus as defined in claim 4, wherein a relative position between said engageable grooves and said engaging ridges corresponds to a speed stage of said change speed device.

6. A shifting apparatus as defined in claim 3, wherein said engageable surface and said engaging surface are friction surfaces frictionally engageable with each other.

7. A shifting apparatus as defined in claim 3, wherein said second lock plate is biased toward said first lock plate by an elastic element interposed between said takeup element and said second lock plate.

8. A shifting apparatus as defined in claim 1, wherein said support shaft has an outside diameter diminishing stepwise from one to the other of said first and second ends.

9. A shifting apparatus as defined in claim 8, wherein said support shaft has an outside diameter diminishing stepwise from said first end to said second end.

10. A shifting apparatus as defined in claim 9, wherein said support shaft is attached at said first end to said bicycle body.

11. A smiling apparatus as defined in claim 1, wherein said shift lever means comprises a first shift lever having a first feed pawl for winding said control cable, and a second shift lever substantially juxtaposed with said first shift lever axially of said support shaft and having a second feed pawl for unwinding said control cable.

12. A shifting apparatus as defined in claim 11, wherein said first shift lever includes a first control portion, and said second shift lever includes a second control portion, said first control portion and said second control portion are separated from each other circumferentially of said axis of said support shaft when said first shift lever and said second shift lever are in respective original positions.

13. A shifting apparatus as defined in claim 12, wherein said first shift lever is operable to rotate said takeup element when said first control portion is moved toward said second control portion, and said second shift lever is operable to rotate said takeup element when said second control portion is moved toward said first control portion.

14. A shifting apparatus as defined in claim 11, wherein said first shift lever and said second shift lever extend in substantially different angular directions when said first shift lever and said second shift lever are in respective original positions.

15. A shifting apparatus as defined in claim 1, wherein said shift lever means comprises a single shift lever having a first feed pawl for winding said control cable in response to pivoting in one direction of said shift lever, and a second feed pawl for unwinding said control cable in response to pivoting in the other direction of said shift lever.

16. A shifting apparatus as defined in claim 15, wherein said shift lever includes a first control portion for winding said control cable, and a second control portion for unwinding said control cable, said first control portion and said second control portion are spaced from each other circumferentially of said axis of said support shaft.

17. A shifting apparatus as defined in claim 15, wherein said shift lever is bifurcated into two distal control portions.

18. A shifting apparatus as defined in claim 1, further comprising return means for returning said shift lever means to an original position after rotating said takeup element, and pawl release means for disengaging said feed pawls from said ratchets when said shift lever means is returned to said original position.

19. A shifting apparatus as defined in claim 18, wherein said pawl release means comprises a substantially disk-shaped fixed cam plate supported on said support shaft between said proximal portion and said cylindrical portion.

* * * * *